United States Patent [19]
Kanai

[11] Patent Number: 5,301,277
[45] Date of Patent: Apr. 5, 1994

[54] METHOD AND APPARATUS FOR COMMUNICATING PERIPHERAL DATA TO/FROM MINOR OPERATING SYSTEMS RUNNING AS SUBPROCESSES ON A MAIN OPERATING SYSTEM

[75] Inventor: Hirouki Kanai, Suwa, Japan

[73] Assignee: Seiko Epson Corporation, Tokyo, Japan

[21] Appl. No.: 812,538

[22] Filed: Dec. 23, 1991

[30] Foreign Application Priority Data

Apr. 10, 1991 [JP] Japan ................................ 3-106761

[51] Int. Cl.5 ............................................ G06F 13/00
[52] U.S. Cl. ..................................... 395/275; 395/650
[58] Field of Search .................. 364/DIG. 1, DIG. 2; 395/275, 700, 650

[56] References Cited

U.S. PATENT DOCUMENTS 4,530,052 7/1985 King et al. ..................... 395/250 X
4,747,040 5/1988 Blanset et al. ...................... 395/650
4,885,681 12/1989 Umeno et al. ....................... 395/700

FOREIGN PATENT DOCUMENTS

62-78631 4/1987 Japan .

Primary Examiner—Robert L. Richardson
Attorney, Agent, or Firm—Harold T. Tsiang

[57] ABSTRACT

A computer system eliminates overhead due to overlapping input processing for a keyboard, etc., by two operating systems, where one is a minor operating system operating as a subprocess of the other, which is a main operating system. The system uses an interrupt from a keyboard interface for input processing. A data input from the keyboard is determined as to whether or not it has been assigned to the minor operating system. If it has been assigned to the minor operating system, the key data is written directly to the key data buffer by the driver of the main operating system. The application program executable under the minor operating system can receive key data from a keyboard driver of the minor operating system.

22 Claims, 7 Drawing Sheets

METHOD AND APPARATUS FOR COMMUNICATING PERIPHERAL DATA TO/FROM MINOR OPERATING SYSTEMS RUNNING AS SUBPROCESSES ON A MAIN OPERATING SYSTEM

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyright rights whatsoever. (37 C.F.R. §1.71(d)–(e).) Specifically, the computer program in Appendix A, which is incorporated herein, is subject to such copyright protection.

BACKGROUND OF THE INVENTION

The present invention relates generally to computer systems and more particularly to computers having a minor operating system that runs under a main operating system and the processing executed under the environment of the minor operating system does data I/O with peripheral equipment controlled by the main operating system.

UNIX operating systems for personal computers has recently begun to appear in the American market. The IBM model AT and other 80386 based machines, such as from COMPAQ have been selling and will support UNIX. In particular, the AT&T System V Release 4 (or 3.2) UNIX runs on 386-based personal computers.

But only a very few application programs will run directly under UNIX. Whereas thousands of programs are compatible with the original MS-DOS operating system offered by IBM and Microsoft. So utilities that enable MS-DOS applications to run under UNIX begun to appear. Called "DOS BOX," MERGE 386 by Locus Computing and VP/IX by Interactive Systems and Phoenix Technologies. In a conventional DOS BOX, when an I/O command is generated by an MS-DOS application program, the activity is detected by a UNIX device driver. An emulation is then engaged to satisfy the MS-DOS device driver. In such cases, the time to do an I/O can be very long. For example, see Japanese Laid Open Patent 62-78631 (Apr. 10, 1987). Eliminating such emulations of peripherals would speed up the overall system.

Peripherals in prior art computer systems are typically under the control of a single, main operating system. Application programs run under the main operating system and transfer data with peripherals via device drivers provided by the main operating system. Minor operating systems emulate device drivers.

A keyboard, when operated, will usually trigger an input interrupt handler in a main operating system. Data is input and interpreted before being temporarily stored. The occurrence of such an input event and the stored input string will be messaged to a minor operating system as dummy interrupts, which activates an input interrupt handler. The minor operating system interprets the messages from the main operating system, and transfers the input type to an input buffer in a memory. Interrupt handlers therefore enable both the main operating system and minor operating system to accept keyboard and/or application program input.

But overlapping input interpretations in both operating systems creates an undesirable processing overhead. The system response to input and output can be very slow for application programs running under a minor operating system, so real time performance is sacrificed.

SUMMARY OF THE PRESENT INVENTION

According to an embodiment of the present invention, a computer system comprises a minor operating system running under a main operating system configured such that applications programs running in the minor operating system's environment exchange data with systems peripherals solely controlled by the main operating system. The minor operating system has a memory that temporarily stores data for exchange with peripherals and a first device driver that shuttles an exchange of data between the process and peripherals via the memory. In the main operating system a data request detector responds to peripheral data I/O requests. A request handler determines whether or not a request corresponds to the minor operating system. A second device driver outputs and stores data to and from peripherals between memory associated with the first device driver and the peripherals when a request has been determined to correspond to the minor operating system. The input processing I/O with peripherals can comprise only input processing, only output processing, or both. The first device driver is used for keyboard input and the second device driver directly rewrites the contents of the memory in the first device driver. Determining whether or not data requests are related to the minor operating system involves referring to control data of the subprocess running under by the main operating system.

An advantage of the present invention is that processing overhead is significantly reduced and real-time performance is thus improved.

Other objects and attainments together with a fuller understanding of the present invention will become apparent and appreciated to those skilled in the art by referring to the following description and claims together with the accompanying drawings.

DETAILED DESCRIPTION OF EMBODIMENTS OF THE PRESENT INVENTION

Figure 1:
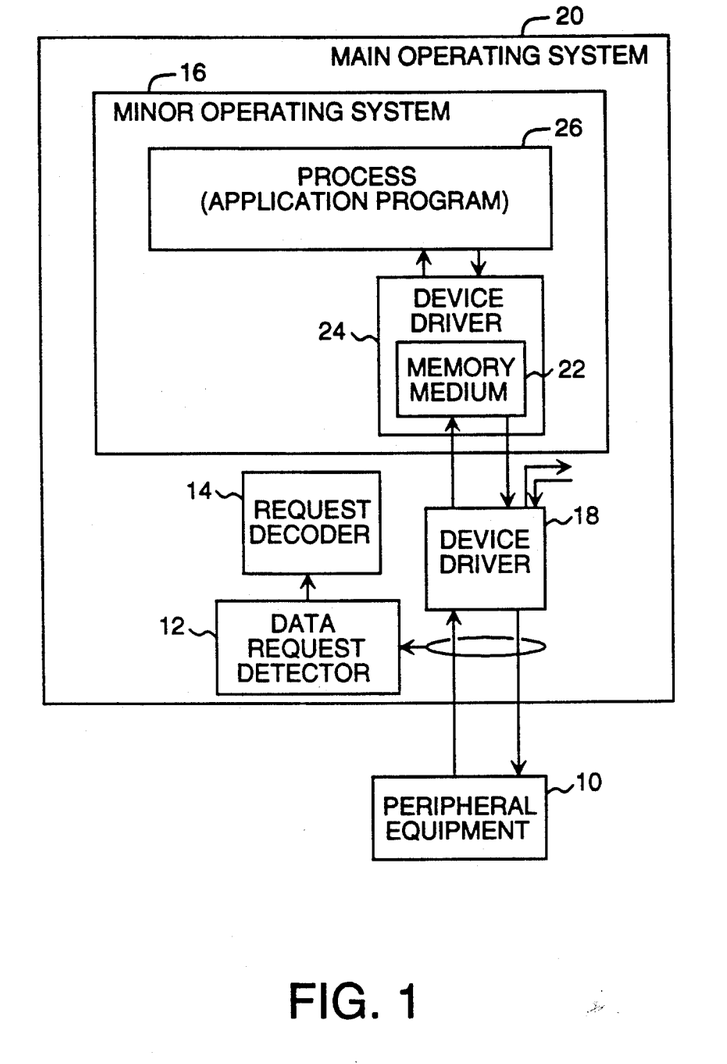
FIG. 1 is a block diagram of a system environment that exists in a first embodiment of the present invention.

FIG. 1 is a system according to a first embodiment of the present invention. When a request for data input originates in a peripheral 10, the request is sensed to by a data request detector 12. If the request is determined by a request decoder 14 to correspond to a minor operating system 16, a device driver 18 in a main operating system 20 stores the necessary data directly into a memory 22 within a device driver 24. Driver 18 can exchange data for external peripherals with either memory 22 or main operating system 20, depending on whether or not minor operating system 16 should be involved in the transfer. Data stored in memory 22 can be read by or deposited any time by a process 26, such as an applications program, executing under the minor operating system 16. Device driver 24 puts output data from process 26 in memory 22. Output is sensed by detector 12. Decoder 14 determines whether or not the output corresponds to the minor operating system 16. If it does, then device driver 18 will output data stored in memory 22 directly to peripheral 10. Requests for the data I/O are tested to see if they correspond to the minor operating system 16. If they do, data is exchanged directly between memory 22 and peripheral 10. Process 26 is saved the burden of determining the environment minor operating system 16 is operating in. Systems 16 and 20 can share the same data I/O processes, and reduce system overhead as a result. Application programs emphasizing real-time performance can therefore be run under minor operating system 16.

Figure 2:
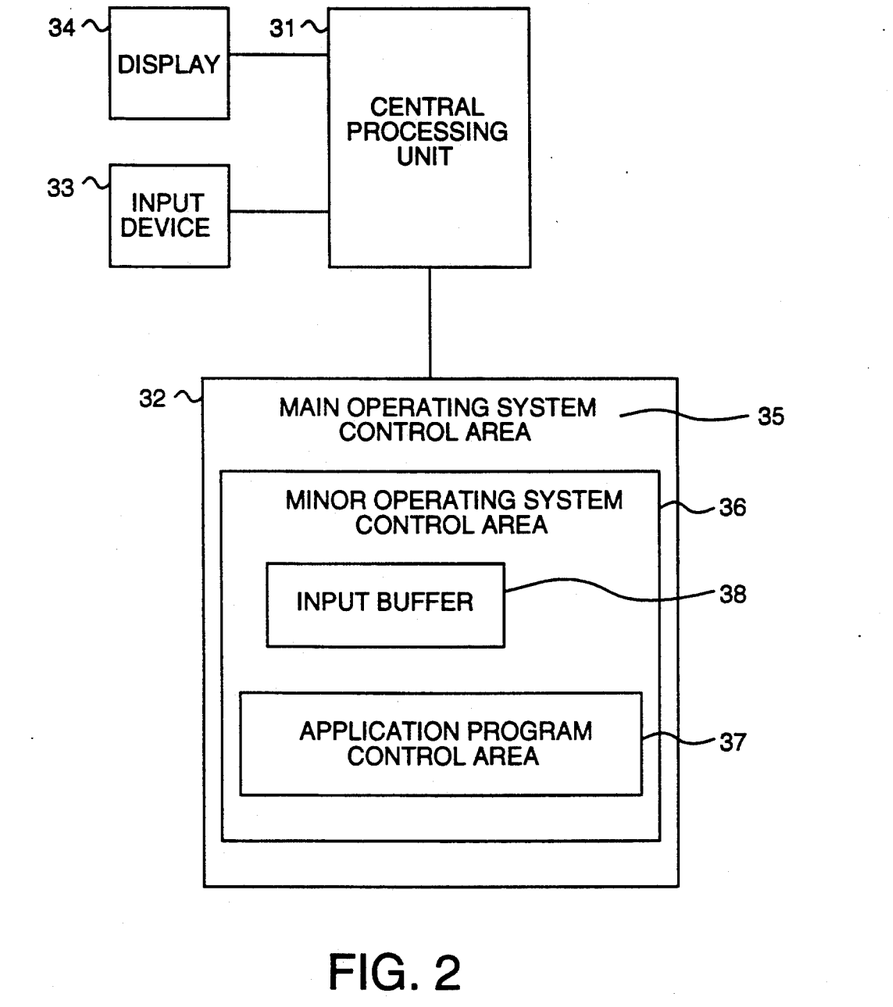
FIG. 2 shows that the main operating system for the system of FIG. 1 contains the minor operating system which has the input buffer and application program control area.

In FIG. 2, a central processing unit (CPU) 31 communicates with a memory 32, an input peripheral 33, and a display 34. Memory 32 comprises a main memory area 35, and a minor memory area 36. Memory area 36 has an input buffer 38 that stores a line of type input from input peripheral 33. Main memory area 35 is accessible to a main operating system (e.g., a UNIX such as main operating system 20) running on CPU 31. Memory area 36 can be managed by a minor operating system (e.g., a MS-DOS such as minor operating system 16) running on CPU 31. A memory area 37 is reserved for loading an application program and its use.

Figure 3:
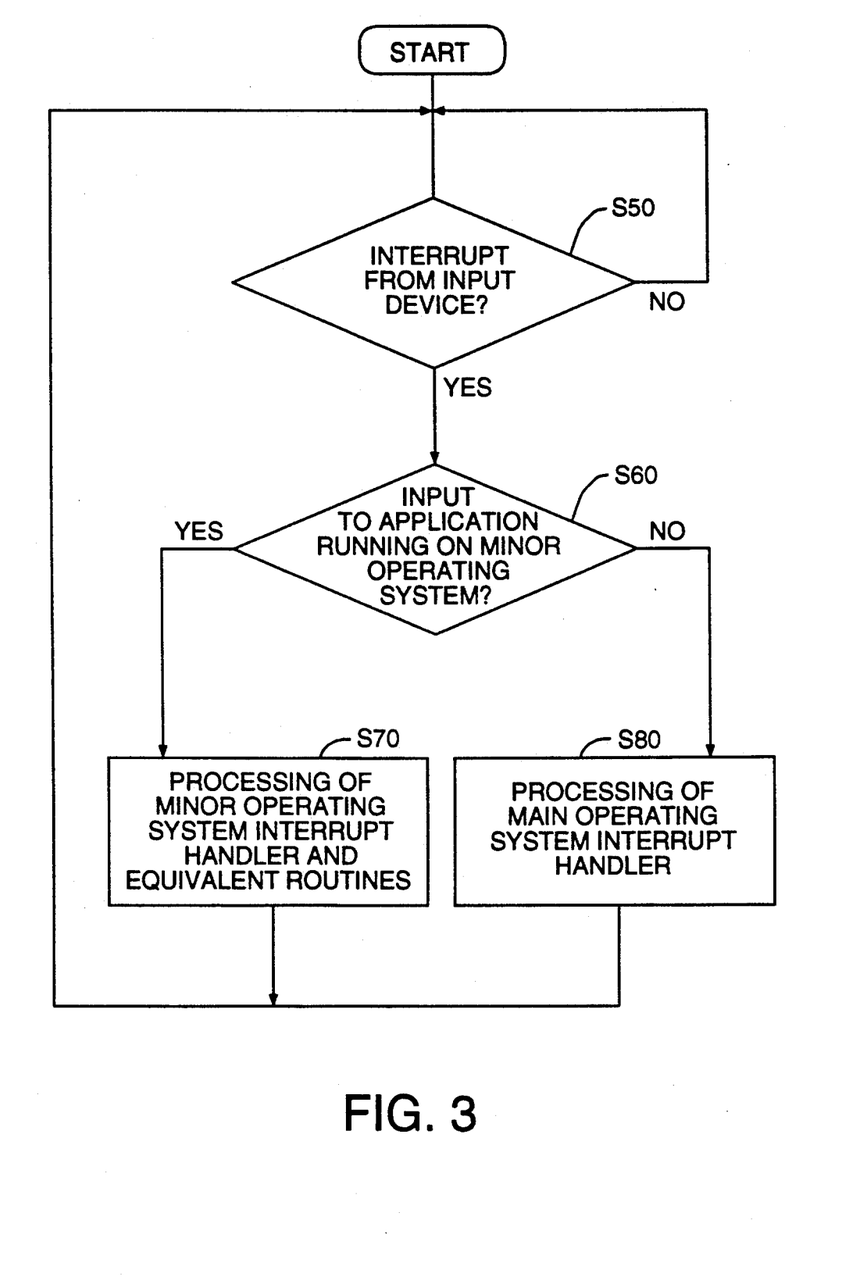
FIG. 3 is a flowchart of the input interrupt handler for the system of FIG. 1.

The computer system of FIGS. 1 and 2 use a computer-implemented process represented by the flowchart of FIG. 3. In step 50, the computer system waits for input by being sensitive to interrupts coming from input peripheral 33. When an interrupt associated with data being input is received by CPU 31, an input interrupt handler in the main operating system is automatically called. Step 60 determines if the input is intended for a minor operating system running on CPU 31 (e.g., the respective peripheral had been assigned by the application program to run with the minor operating system). If so, step 70 emulates the original minor operating system's input interrupt handler, and data input is directly transferred to an input buffer, such as buffer 38. The minor operating system can thereby communicate input to an application program as if it were a real-time input event and had been taken care of by its own input interrupt handler. If input is not for the application program, then control is directed to step 80 which invokes the main operating system's interrupt handler.

Figure 4:
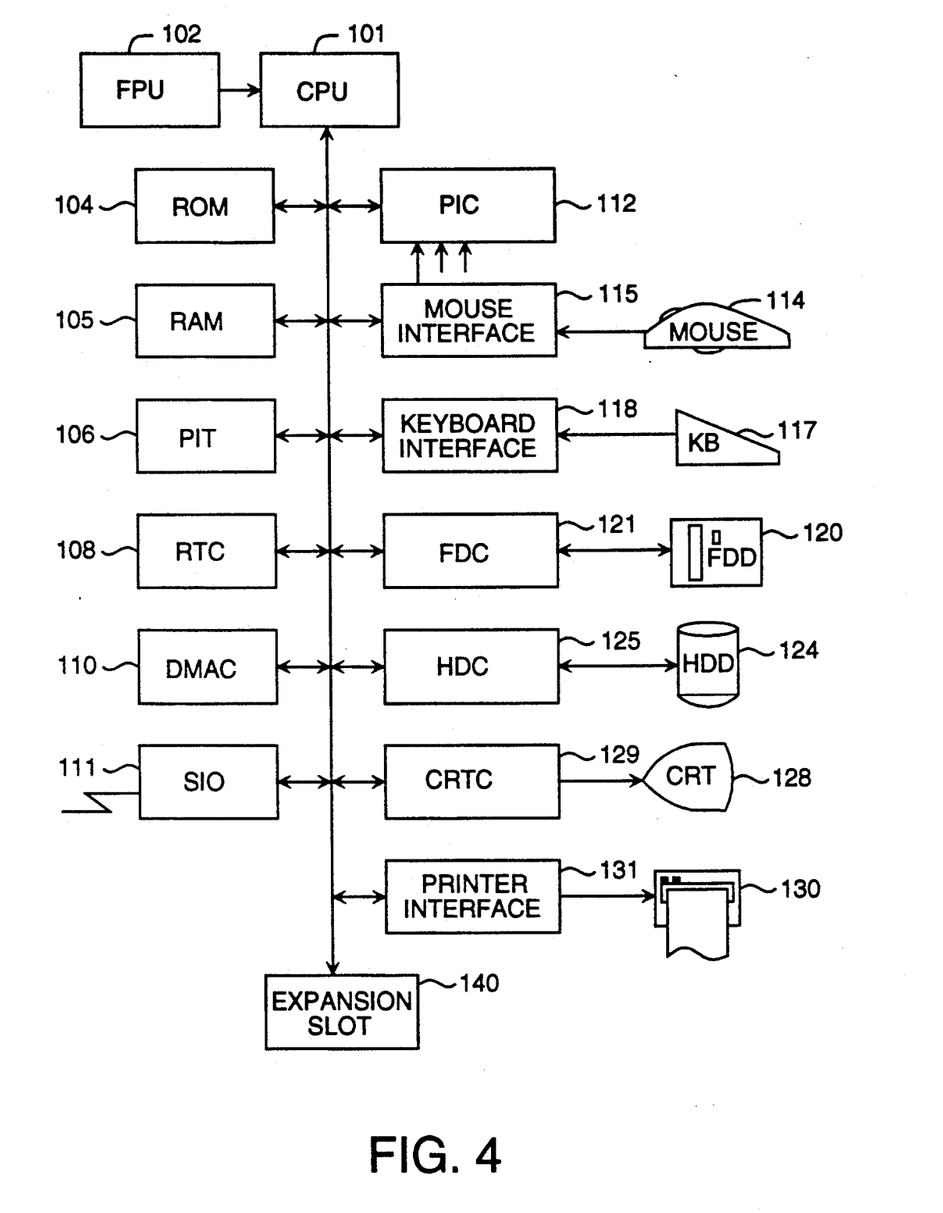
FIG. 4 is a block diagram of a hardware system according to a second embodiment of the present invention.

FIG. 4 is a computer system according to a second embodiment of the present invention and comprises a CPU 101, a floating point unit (FPU) 102, a read only memory (ROM) 104, a random access memory (RAM) 105, a programmable interval timer (PIT) 106, a real time clock (RTC) 108, a direct memory access controller (DMAC) 110, a serial I/O (SIO) 111, a programmable interrupt controller (PIC) 112, a mouse 114 and interface 115, a keyboard 117 and interface 118, a floppy disk drive (FDD) 120 and controller (FDC) 121, a hard disk drive (HDD) 124 and controller (HDC) 125, a cathode ray tube (CRT) display 128 and controller (CRTC) 129, a printer 130 and interface 131, and an expansion slot 140. Devices 101 through 140 communicate via a bus common to all. CPU 101 is preferably an Intel 80386, or equivalent. FPU 102 is a floating point unit that operates as a coprocessor to CPU 101. ROM 104 stores a monitor program, etc. RAM 105 is the main memory and is read/write. PIT 106 is an interval timer that generates a periodic interrupt. RTC 108 is a real time clock circuit with a back up power supply source to keep the time. DMAC 110 controls direct memory transfers via the bus. SIO 111 controls RS-232C serial communications. PIC 112 is a interrupt controller that assigns a priority to and controls each type of interrupt. Mouse interface 115 receives user commands via the two-button mouse 114. Keyboard interface 118 receives user keyed input from keyboard 117. FDC 121 is a flexible disk controller that controls the flexible disk driver (FDD) 120. HDC 125 is a hard disk controller that controls the hard disk drive (HDD) 124. CRTC 129 sends video signal output to CRT 128, which displays the necessary data, etc. Printer interface 131 controls the output of data to the printer 130. Expansion slot 140 is used for future expansion, such as with add-on cards.

The computer system uses a time-multiplexed operating system capable of multitasking as both a main operating system and a single-tasking disk operating system running as a subprocess (minor operating system). Various types of application programs can be run under the control of the main operating system. Some commercially available application programs may only be able to run under the minor operating system. Keyboard 117, flexible disk drive 120, mouse 114, and the other peripherals, are all controlled by the main operating system. Data is exchanged between them and a process running on the main operating system via device drivers included in the main operating system. Data cannot be directly exchanged between peripherals and the minor operating system which has conventional device drivers. Application programs running under the minor operating system will input and output data via the various device drivers of the minor operating system, just as if the minor operating system was being used alone.

When the minor operating system is operating alone and there is an interrupt request from a peripheral, the minor operating system's device driver issues an input instruction (IN) or an output instruction (OUT) to the hardware assigned to the I/O address. Here, interrupt requests from the peripheral are controlled by the main operating system, and any interrupt request can be steered to the main operating system device driver or minor operating system device driver, as required. For example, input data from keyboard 117 will cause an interrupt request to be output to the keyboard driver in the main operating system, and will not be received by the keyboard driver of the minor operating system.

Figure 5:
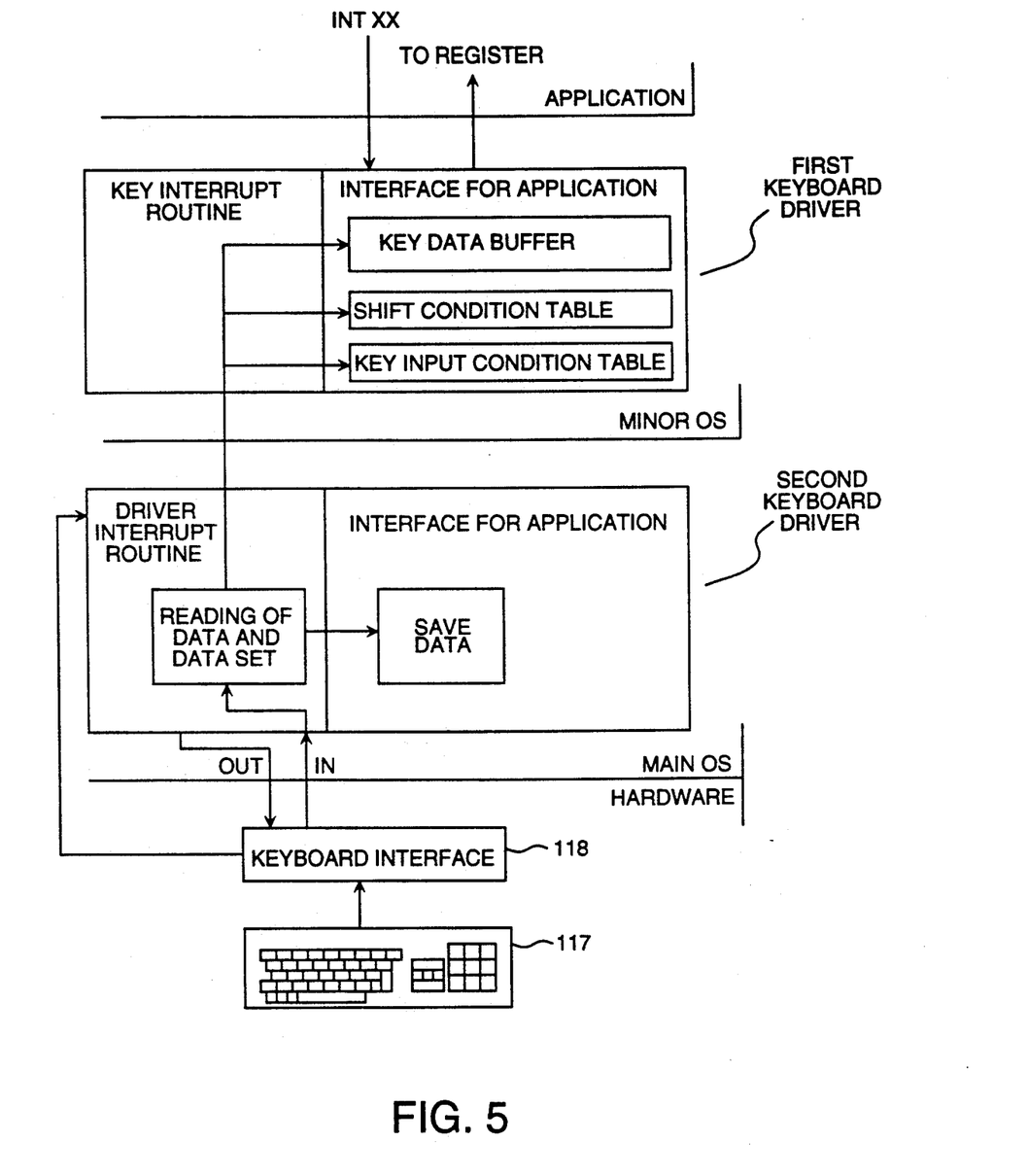
FIG. 5 is a schematic of the data flow in the system of FIG. 4 from the keyboard to the driver interrupt handler and second keyboard driver in the main operating system, to the key interrupt routine and first keyboard driver in the minor operating system, to the application program running under the minor operating system.
Figure 6:
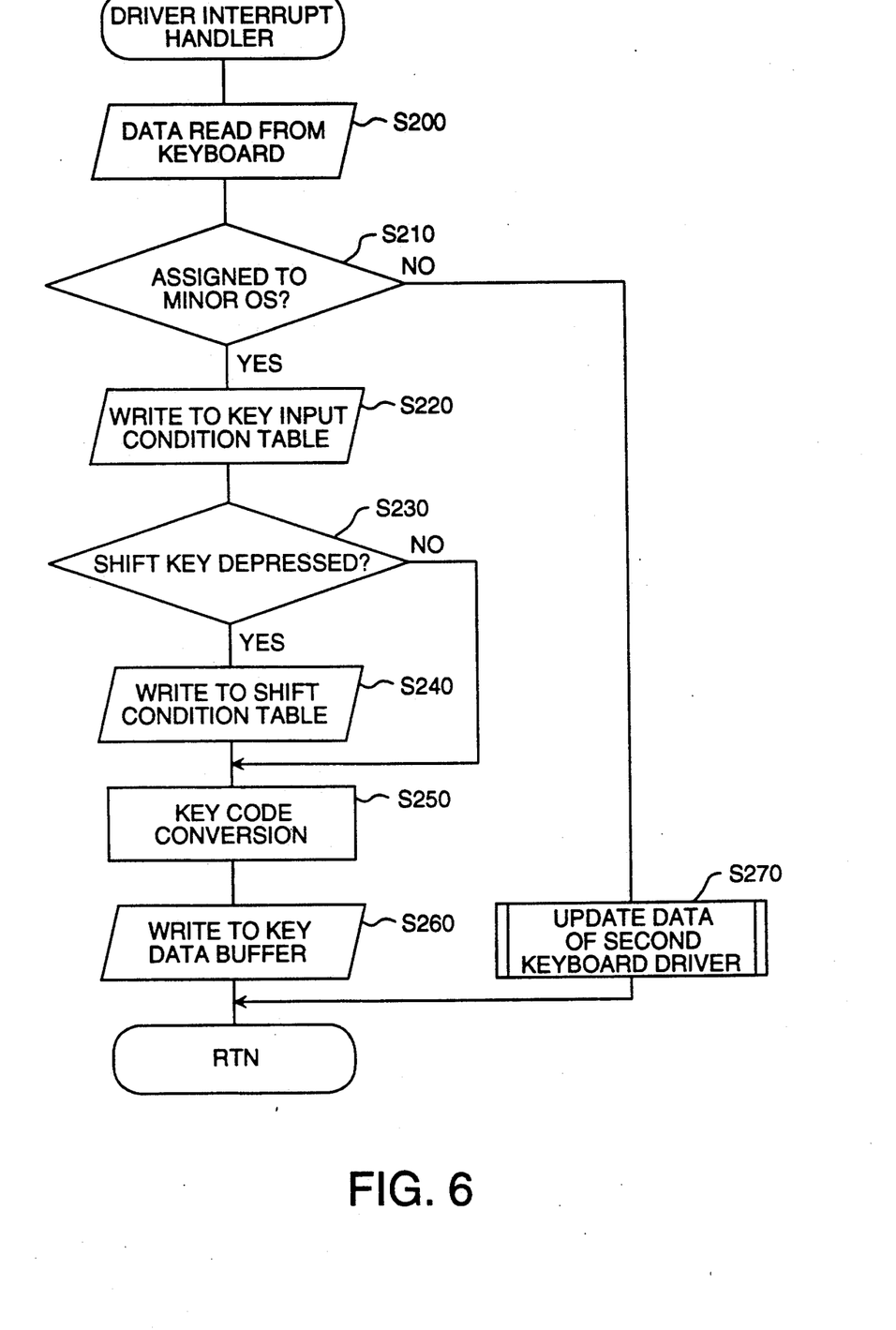
FIG. 6 is a flowchart of the driver interrupt handler in the second embodiment of FIG. 4.

FIG. 5 shows how data flows from a keyboard up to an application program. FIG. 6 flowcharts the driver interrupt handler in the keyboard driver (e.g., driver 18)

in the main operating system. When a key on a keyboard 117 is depressed, an interrupt is generated via a keyboard interface 118. This interrupt is routed to PIC 112 (FIG. 4), and if the interrupt is allowed, then processing is done by driver 18. An interrupt handler in the main operating system is called, and in step 200, data is read in from keyboard 117 via the keyboard interface 118. Step 210 determines whether or not keyboard 117 is currently assigned to the minor operating system by referring to an attribute table controlled by a system kernel, which is a subprocess in the main operating system. If data from keyboard 117 is assigned to the minor operating system, in step 220 data is written to a key input condition table so that the minor operating system can discriminate which key on the keyboard has been pressed. Step 230 checks to see if it was the shift key that was pressed, and if it was, then the shift condition table is substituted and step 250 converts the key code to a character code, which is output to the keyboard buffer in step 260. Afterwards, the routine executes a return. If step 210 decided the keyed input was not for the minor operating system, step 270 sends the data to the main operating system. Driver 18 stores data in a form that allows the main operating system to receive requests from the application program and it can also supply keyed input data to an application program.

Figure 7A:
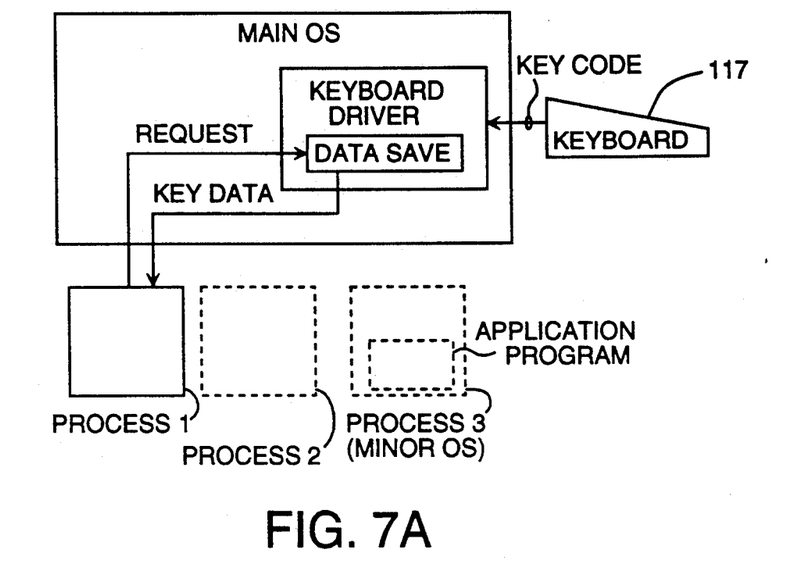
FIGS. 7A and 7B diagram the situation that exists when key input for a minor operating system is assigned to one of multiple processes running under the main operating system.
Figure 7B:
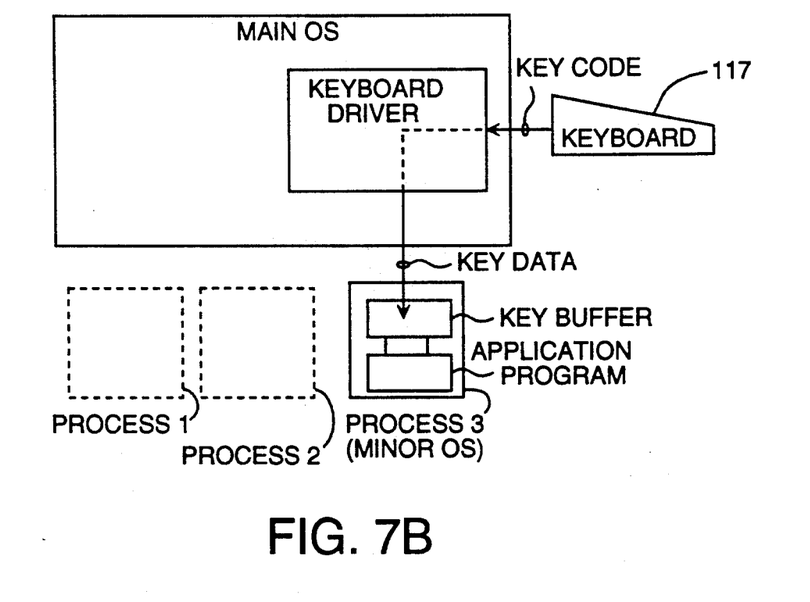

Refer now to FIGS. 7A and 7B. Multiple subprocesses can be operated under a main operating system, and any of them can be minor operating systems. The subprocesses not necessarily need to deal with the fact that they are running as subprocesses. Keyboard 117 is assigned to a first process for purposes of this explanation only. Data from keyboard 117 is stored in a memory reserved to a keyboard driver belonging to the main operating system. The data is passed to the first process by a data request (system call) from the first process. But if keyboard 117 has been assigned to the minor operating system, the data is written directly to a table and buffer in a keyboard driver in a third process comprising a minor operating system (FIG. 7B) and an applications program. So, when data input from keyboard 117 has been assigned to a particular minor operating system, the keyboard drivers in the main operating system and the minor operating system do not duplicate each other, thus preventing an unnecessary overhead. This facilitates the running of application programs that emphasize real time performance. Since minor operating systems that operate as subprocesses of a main operating systems do not need to discriminate whether they are running on a main operating system or are running directly, the minor operating system and application programs that operate under the control of the minor operating system do not require any modification. Therefore, prior software libraries can be used to full advantage while also actively using high level main operating system.

A computer program listing is included here in Appendix A and represents one way to implement the above in "C" source code. At page 1, line 2, of Appendix A, the phrase if (V-active) checks to see if the current process is minor operating system and if so, sets a flag. At line 5, "*cp++" inputs data from device driver (key data). "Keyin" copies to memory 22. After line 8, the request decoder in data request detector 12 is implemented. Lines 12 through 214, spanning pages 1 through 4 constitute the table referred to in FIG. 6. The "keyin(procp, atscan)" phrase at line 217 begins steps 220 through 260 (FIG. 6). Lines 1-36 on page 8 of Appendix A are the data definition which is used in FIG. 6.

The present invention is not limited to the embodiments described above. Other input peripherals can be handled, as well as output devices. Whatever the peripherals being used, it is important to assign each temporarily or permanently to the minor and/or main operating systems such that those assignments can be accessed each time the main operating system's device drivers have peripheral data traffic.

While the present invention has been described in conjunction with several specific embodiments, it is evident to those skilled in the art that many further alternatives, modifications and variations will be apparent in light of the foregoing description. Thus, the present invention described herein is intended to embrace all such alternatives, modifications, applications and variations as may fall within the spirit and scope of the appended claims.

Appenix A

```
{
    while(cnt-- != 0){
    }
    return ;
}
```

```
/* at scan code ---> pc scan code */
unsigned char  at2pctbl[128] = {
        0x00,0x00,0x01,0x02,0x03,0x04,0x05,0x06, /* 0x00-0x07 */
        0x07,0x08,0x09,0x0a,0x0b,0x0c,0x0e,0x0f, /* 0x08-0x0f */
        0x10,0x11,0x12,0x13,0x14,0x15,0x16,0x17, /* 0x10-0x17 */
        0x18,0x19,0x1b,0x28,0x1c,0x74,0x1d,0x1e, /* 0x18-0x1f */
        0x1f,0x20,0x21,0x22,0x23,0x24,0x25,0x26, /* 0x20-0x27 */
        0x27,0x1a,0x70,0x0d,0x29,0x2a,0x2b,0x2c, /* 0x28-0x2f */
        0x2d,0x2e,0x2f,0x30,0x31,0x32,0x00,0x45, /* 0x30-0x37 */
        0x73,0x34,0x71,0x62,0x63,0x64,0x65,0x66, /* 0x38-0x3f */
        0x67,0x68,0x69,0x6a,0x6b,0x00,0x55,0x42, /* 0x40-0x47 */
```

```
       0x43,0x44,0x40,0x46,0x47,0x48,0x49,0x4a, /* 0x48-0x4f */
       0x4b,0x4c,0x4e,0x50,0x54,0x3d,0x3b,0x52, /* 0x50-0x57 */
       0x53,0x00,0x00,0x00,0x00,0x00,0x00,0x00, /* 0x58-0x5f */
       0x00,0x00,0x00,0x00,0x00,0x35,0x51,0x80, /* 0x60-0x67 */
       0x61,0x72,0x33,0x4d,0x45,0x00,0x00,0x36, /* 0x68-0x6f */
       0x00,0x00,0x00,0x00,0x00,0x41,0x00,0x56, /* 0x70-0x77 */
       0x3a,0x39,0x3f,0x38,0x00,0x3c,0x37,0x3e  /* 0x78-0x7f */
};

/* pc scan code ---> pc ascii code */
unsigned char  scan2ascii[8][128] = {
       {       /* NON */
       0x1b,0x31,0x32,0x33,0x34,0x35,0x36,0x37, /* 0x00-0x07 */
       0x38,0x39,0x30,0x2d,0x5e,0x5c,0x08,0x09, /* 0x08-0x0f */
       0x71,0x77,0x65,0x72,0x74,0x79,0x75,0x69, /* 0x10-0x17 */
       0x6f,0x70,0x40,0x5b,0x0d,0x61,0x73,0x64, /* 0x18-0x1f */
       0x66,0x67,0x68,0x6a,0x6b,0x6c,0x3b,0x3a, /* 0x20-0x27 */
       0x71,0x7a,0x78,0x63,0x76,0x62,0x6e,0x6d, /* 0x28-0x2f */
       0x2c,0x2e,0x2f,0xff,0x20,0x00,0x00,0x00, /* 0x30-0x37 */
       0x00,0x00,0x00,0x00,0x00,0x00,0x00,0x00, /* 0x38-0x3f */
       0x2d,0x2f,0x37,0x38,0x39,0x2a,0x34,0x35, /* 0x40-0x47 */
       0x36,0x2b,0x31,0x32,0x33,0x3d,0x30,0x2c, /* 0x48-0x4f */
       0x2e,0x00,0x00,0x00,0x00,0x00,0x00,0xff, /* 0x50-0x57 */
       0xff,0xff,0xff,0xff,0xff,0xff,0xff,0xff, /* 0x58-0x5f */
       0x00,0x00,0x00,0x00,0x00,0x00,0x00,0x00, /* 0x60-0x67 */
       0x00,0x00,0x00,0x00,0xff,0xff,0xff,0xff, /* 0x68-0x6f */
       0x00,0x00,0x00,0x00,0x00,0xff,0xff,0xff, /* 0x70-0x77 */
       0xff,0xff,0xff,0xff,0xff,0xff,0xff,0xff  /* 0x78-0x7f */
       },
       {       /* SHIFT */
       0x1b,0x21,0x22,0x23,0x24,0x25,0x26,0x27, /* 0x00-0x07 */
       0x28,0x29,0x30,0x3d,0x60,0x7c,0x08,0x09, /* 0x08-0x0f */
       0x51,0x57,0x45,0x52,0x54,0x59,0x55,0x49, /* 0x10-0x17 */
       0x4f,0x50,0x7e,0x7b,0x0d,0x41,0x53,0x44, /* 0x18-0x1f */
       0x46,0x47,0x48,0x4a,0x4b,0x4c,0x2b,0x2a, /* 0x20-0x27 */
       0x7d,0x5a,0x58,0x43,0x56,0x42,0x4e,0x4d, /* 0x28-0x2f */
       0x3c,0x3e,0x3f,0x5f,0x20,0x00,0x00,0x00, /* 0x30-0x37 */
       0x00,0x00,0x00,0x00,0x00,0x00,0x00,0x00, /* 0x38-0x3f */
       0x2d,0x2f,0x37,0x38,0x39,0x2a,0x34,0x35, /* 0x40-0x47 */
       0x36,0x2b,0x31,0x32,0x33,0x3d,0x30,0x2c, /* 0x48-0x4f */
       0x2e,0x00,0x00,0x00,0x00,0x00,0x00,0xff, /* 0x50-0x57 */
       0xff,0xff,0xff,0xff,0xff,0xff,0xff,0xff, /* 0x58-0x5f */
       0x00,0x00,0x00,0x00,0x00,0x00,0x00,0x00, /* 0x60-0x67 */
       0x00,0x00,0x00,0x00,0xff,0xff,0xff,0xff, /* 0x68-0x6f */
       0x00,0x00,0x00,0x00,0x00,0xff,0xff,0xff, /* 0x70-0x77 */
       0xff,0xff,0xff,0xff,0xff,0xff,0xff,0xff  /* 0x78-0x7f */
       },
       {       /* CAPS */
       0x1b,0x31,0x32,0x33,0x34,0x35,0x36,0x37, /* 0x00-0x07 */
       0x38,0x39,0x30,0x2d,0x5e,0x5c,0x08,0x09, /* 0x08-0x0f */
       0x51,0x57,0x45,0x52,0x54,0x59,0x55,0x49, /* 0x10-0x17 */
       0x4f,0x50,0x40,0x5b,0x0d,0x41,0x53,0x44, /* 0x18-0x1f */
       0x46,0x47,0x48,0x4a,0x4b,0x4c,0x3b,0x3a, /* 0x20-0x27 */
       0x5d,0x5a,0x58,0x43,0x56,0x42,0x4e,0x4d, /* 0x28-0x2f */
       0x2c,0x2e,0x2f,0xff,0x20,0x00,0x00,0x00, /* 0x30-0x37 */
       0x00,0x00,0x00,0x00,0x00,0x00,0x00,0x00, /* 0x38-0x3f */
```

```
0x2d,0x2f,0x37,0x38,0x39,0x2a,0x34,0x35, /* 0x40-0x47 */
0x36,0x2b,0x31,0x32,0x33,0x3d,0x30,0x2c, /* 0x48-0x4f */
0x2e,0x00,0x00,0x00,0x00,0x00,0x00,0xff, /* 0x50-0x57 */
0xff,0xff,0xff,0xff,0xff,0xff,0xff,0xff, /* 0x58-0x5f */
0x00,0x00,0x00,0x00,0x00,0x00,0x00,0x00, /* 0x60-0x67 */
0x00,0x00,0x00,0x00,0xff,0xff,0xff,0xff, /* 0x68-0x6f */
0x00,0x00,0x00,0x00,0x00,0xff,0xff,0xff, /* 0x70-0x77 */
0xff,0xff,0xff,0xff,0xff,0xff,0xff,0xff  /* 0x78-0x7f */
},
{       /* SHIFT + CAPS */
0x1b,0x21,0x22,0x23,0x24,0x25,0x26,0x27, /* 0x00-0x07 */
0x28,0x29,0x30,0x3d,0x60,0x7c,0x08,0x09, /* 0x08-0x0f */
0x71,0x77,0x65,0x72,0x74,0x79,0x75,0x69, /* 0x10-0x17 */
0x6f,0x70,0x7e,0x7b,0x0d,0x81,0x73,0x64, /* 0x18-0x1f */
0x66,0x67,0x68,0x6a,0x6b,0x6c,0x2b,0x2a, /* 0x20-0x27 */
0x7d,0x7a,0x78,0x63,0x76,0x62,0x6e,0x6d, /* 0x28-0x2f */
0x3c,0x3e,0x3f,0x5f,0x20,0x00,0x00,0x00, /* 0x30-0x37 */
0x00,0x00,0x00,0x00,0x00,0x00,0x00,0x00, /* 0x38-0x3f */
0x2d,0x2f,0x37,0x38,0x39,0x2a,0x34,0x35, /* 0x40-0x47 */
0x36,0x2b,0x31,0x32,0x33,0x3d,0x30,0x2c, /* 0x48-0x4f */
0x2e,0x00,0x00,0x00,0x00,0x00,0x00,0xff, /* 0x50-0x57 */
0xff,0xff,0xff,0xff,0xff,0xff,0xff,0xff, /* 0x58-0x5f */
0x00,0x00,0x00,0x00,0x00,0x00,0x00,0x00, /* 0x60-0x67 */
0x00,0x00,0x00,0x00,0xff,0xff,0xff,0xff, /* 0x68-0x6f */
0x00,0x00,0x00,0x00,0x00,0xff,0xff,0xff, /* 0x70-0x77 */
0xff,0xff,0xff,0xff,0xff,0xff,0xff,0xff  /* 0x78-0x7f */
},
{       /* KANA */
0x1b,0xc7,0xcc,0xb1,0xb3,0xb4,0xb5,0xd4, /* 0x00-0x07 */
0xd5,0xd6,0xdc,0xce,0xcd,0xb0,0x08,0x09, /* 0x08-0x0f */
0xc0,0xc3,0xb2,0xbd,0xb6,0xdd,0xc5,0xc6, /* 0x10-0x17 */
0xd7,0xbe,0xde,0xdf,0x0d,0xc1,0xc4,0xbc, /* 0x18-0x1f */
0xca,0xb7,0xb8,0xcf,0xc9,0xd8,0xda,0xb9, /* 0x20-0x27 */
0xd1,0xc2,0xbb,0xbf,0xcb,0xba,0xd0,0xd3, /* 0x28-0x2f */
0xc8,0xd9,0xd2,0xdb,0x20,0x00,0x00,0x00, /* 0x30-0x37 */
0x00,0x00,0x00,0x00,0x00,0x00,0x00,0x00, /* 0x38-0x3f */
0x2d,0x2f,0x37,0x38,0x39,0x2a,0x34,0x35, /* 0x40-0x47 */
0x36,0x2b,0x31,0x32,0x33,0x3d,0x30,0x2c, /* 0x48-0x4f */
0x2e,0x00,0x00,0x00,0x00,0x00,0x00,0xff, /* 0x50-0x57 */
0xff,0xff,0xff,0xff,0xff,0xff,0xff,0xff, /* 0x58-0x5f */
0x00,0x00,0x00,0x00,0x00,0x00,0x00,0x00, /* 0x60-0x67 */
0x00,0x00,0x00,0x00,0xff,0xff,0xff,0xff, /* 0x68-0x6f */
0x00,0x00,0x00,0x00,0x00,0xff,0xff,0xff, /* 0x70-0x77 */
0xff,0xff,0xff,0xff,0xff,0xff,0xff,0xff  /* 0x78-0x7f */
},
{       /* KANA + SHIFT */
0x1b,0xc7,0xcc,0xa7,0xa9,0xaa,0xab,0xac, /* 0x00-0x07 */
0xad,0xae,0xa6,0xce,0xcd,0xb0,0x08,0x09, /* 0x08-0x0f */
0xc0,0xc3,0xa8,0xbd,0xb6,0xdd,0xc5,0xc6, /* 0x10-0x17 */
0xd7,0xbe,0xde,0xa2,0x0d,0xc1,0xc4,0xbc, /* 0x18-0x1f */
0xca,0xb7,0xb8,0xcf,0xc9,0xd8,0xda,0xb9, /* 0x20-0x27 */
0xa3,0xaf,0xbb,0xbf,0xcb,0xba,0xd0,0xd3, /* 0x28-0x2f */
0xa4,0xa1,0xa5,0xdb,0x20,0x00,0x00,0x00, /* 0x30-0x37 */
0x00,0x00,0x00,0x00,0x00,0x00,0x00,0x00, /* 0x38-0x3f */
0x2d,0x2f,0x37,0x38,0x39,0x2a,0x34,0x35, /* 0x40-0x47 */
0x36,0x2b,0x31,0x32,0x33,0x3d,0x30,0x2c, /* 0x48-0x4f */
```

```
        0x2e,0x00,0x00,0x00,0x00,0x00,0x00,0xff,  /* 0x50-0x57 */
        0xff,0xff,0xff,0xff,0xff,0xff,0xff,0xff,  /* 0x58-0x5f */
        0x00,0x00,0x00,0x00,0x00,0x00,0x00,0x00,  /* 0x60-0x67 */
        0x00,0x00,0x00,0x00,0xff,0xff,0xff,0xff,  /* 0x68-0x6f */
        0x00,0x00,0x00,0x00,0x00,0xff,0xff,0xff,  /* 0x70-0x77 */
        0xff,0xff,0xff,0xff,0xff,0xff,0xff,0xff   /* 0x78-0x7f */
    },
    {       /* GRAP */
        0x1b,0xff,0xff,0xff,0xff,0xf2,0xf3,0xf4,  /* 0x00-0x07 */
        0xf5,0xf6,0xf7,0x8c,0x8b,0xf1,0x08,0x19,  /* 0x08-0x0f */
        0x9c,0x9d,0xe4,0xe5,0xee,0xef,0xf0,0xe8,  /* 0x10-0x17 */
        0xe9,0x8d,0x8a,0xff,0x0d,0x9e,0x9f,0xe6,  /* 0x18-0x1f */
        0xe7,0xec,0xed,0xea,0xeb,0x8e,0x89,0x94,  /* 0x20-0x27 */
        0xff,0x80,0x81,0x82,0x83,0x84,0x85,0x86,  /* 0x28-0x2f */
        0x87,0x88,0x97,0xff,0x20,0x00,0x00,0x00,  /* 0x30-0x37 */
        0x00,0x00,0x00,0x00,0x00,0x00,0xff,0x00,  /* 0x38-0x3f */
        0x2d,0x2f,0x98,0x91,0x99,0x95,0xe1,0xe2,  /* 0x40-0x47 */
        0xe3,0xe0,0x93,0x8f,0x92,0x96,0x9a,0x90,  /* 0x48-0x4f */
        0x9b,0x00,0xff,0xff,0xff,0xff,0xff,0xff,  /* 0x50-0x57 */
        0xff,0xff,0xff,0xff,0xff,0xff,0xff,0xff,  /* 0x58-0x5f */
        0xff,0xff,0xff,0xff,0xff,0xff,0xff,0xff,  /* 0x60-0x67 */
        0xff,0xff,0xff,0xff,0xff,0xff,0xff,0xff,  /* 0x68-0x6f */
        0xff,0xff,0xff,0xff,0xff,0xff,0xff,0xff,  /* 0x70-0x77 */
        0xff,0xff,0xff,0xff,0xff,0xff,0xff,0xff   /* 0x78-0x7f */
    },
    {       /* CTRL */
        0xff,0xff,0xff,0xff,0xff,0xff,0xff,0xff,  /* 0x00-0x07 */
        0xff,0xff,0xff,0xff,0x1e,0x1c,0x08,0x09,  /* 0x08-0x0f */
        0x11,0x17,0x05,0x12,0x14,0x19,0x15,0x09,  /* 0x10-0x17 */
        0x0f,0x10,0x00,0x1b,0x0d,0x01,0x13,0x04,  /* 0x18-0x1f */
        0x06,0x07,0x08,0x0a,0x0b,0x0c,0xff,0xff,  /* 0x20-0x27 */
        0x1d,0x1a,0x18,0x03,0x16,0x02,0x05,0x0d,  /* 0x28-0x2f */
        0xff,0xff,0xff,0x1f,0x20,0x00,0x00,0x00,  /* 0x30-0x37 */
        0x00,0x00,0x00,0x00,0x00,0x00,0xff,0x00,  /* 0x38-0x3f */
        0x2d,0x2f,0x37,0x38,0x39,0x2a,0x34,0x35,  /* 0x40-0x47 */
        0x36,0x2b,0x31,0x32,0x33,0x3d,0x30,0x3c,  /* 0x48-0x4f */
        0x2e,0x00,0x00,0x00,0x00,0x00,0x00,0xff,  /* 0x50-0x57 */
        0xff,0xff,0xff,0xff,0xff,0xff,0xff,0xff,  /* 0x58-0x5f */
        0x00,0x00,0x00,0x00,0x00,0x00,0x00,0x00,  /* 0x60-0x67 */
        0x00,0x00,0x00,0x00,0xff,0xff,0xff,0xff,  /* 0x68-0x6f */
        0x00,0x00,0x00,0x00,0x00,0xff,0xff,0xff,  /* 0x70-0x77 */
        0xff,0xff,0xff,0xff,0xff,0xff,0xff,0xff   /* 0x78-0x7f */
    }
};

/* shift status ---> scan2ascii[?][0...127] table offset */
char    s2aoff[32] = {
        T_NON,                  /* 0 */
        T_SHIFT,                /* 1 */
        T_CAPS,                 /* 2 */
        T_SHIFTCAPS,            /* 3 */
        T_KANA,                 /* 4 */
        T_KANASHIFT,            /* 5 */
        T_KANA,                 /* 6 */
        T_KANASHIFT,            /* 7 */
        T_GRAP,                 /* 8 */
```

```
        T_GRAP,         /* 9 */
        T_GRAP,         /* 10 */
        T_GRAP,         /* 11 */
        T_GRAP,         /* 12 */
        T_GRAP,         /* 13 */
        T_GRAP,         /* 14 */
        T_GRAP,         /* 15 */
        T_CTRL,         /* 16 */
        T_CTRL,         /* 17 */
        T_CTRL,         /* 18 */
        T_CTRL,         /* 19 */
        T_CTRL,         /* 20 */
        T_CTRL,         /* 21 */
        T_CTRL,         /* 22 */
        T_CTRL,         /* 23 */
        T_CTRL,         /* 24 */
        T_CTRL,         /* 25 */
        T_CTRL,         /* 26 */
        T_CTRL,         /* 27 */
        T_CTRL,         /* 28 */
        T_CTRL,         /* 29 */
        T_CTRL,         /* 30 */
        T_CTRL          /* 31 */
};

keyin(procp, atscan)
        struct proc_t *procp;
        register unsigned char atscan;
        {
          register unsigned char pcscan;
          unsigned char ascii;

pcscan = at2pctbl[atscan & 0x7f];
          if(pcscan >= 0x70 && pcscan <= 0x74){
             if((atscan & 0x80) == 0){
                *SHIFT_ST |= 1 << (pcscan - 0x70);
             }
             else{
                *SHIFT_ST &= ~(1 << (pcscan - 0x70));
             }
          }
          else{
             ;
          }
          if(atscan & 0x80){
             *(KEY_ST + (pcscan >> 3)) &= ~(1 << (pcscan & 0x07));
          }
          else{
             *(KEY_ST + (pcscan >> 3)) |= 1 << (pcscan & 0x07);
             if((ascii = scan2ascii[(int)s2aoff[*SHIFT_ST & 0x1f]][pcscan]) != 0xff){
                if(pcscan == 0x3e){
                   if(*SHIFT_ST & S_SHIFT){
                      pcscan = 0x5e;
                   }
                   else{
                      ;
```

```
            }
        }
        else if(pcscan == 0x5e){
            pcscan = 0xae;
        }
        else if(pcscan == 0x35){
            if(*SHIFT_ST & S_SHIFT){
                pcscan = 0xa5;
            }
            else if(*SHIFT_ST & S_CTRL){
                pcscan = 0xb5;
            }
            else{
                ;
            }
        }
        else if(pcscan == 0x51){
            if(*SHIFT_ST & S_SHIFT){
                pcscan = 0xa1;
            }
            else if(*SHIFT_ST & S_CTRL){
                pcscan = 0xb1;
            }
            else{
                ;
            }
        }
        else if((pcscan >= 0x52) && (pcscan <= 0x56)){
            if(*SHIFT_ST & S_SHIFT){
                pcscan = 0xc0 | (pcscan & 0x0f);
            }
            else if(*SHIFT_ST & S_CTRL){
                pcscan = 0xd0 | (pcscan & 0x0f);
            }
            else{
                ;
            }
        }
        else if((pcscan >= 0x62) && (pcscan <= 0x6b)){
            if(*SHIFT_ST & S_SHIFT){
                pcscan = 0x80 | (pcscan & 0x0f);
            }
            else if(*SHIFT_ST & S_CTRL){
                pcscan = 0x90 | (pcscan & 0x0f);
            }
            else{
                ;
            }
        }
        else{
            ;
        }
        keyset(ascii, pcscan);
    }
    else{
        ;
```

```
            }

/* if GRAP + STOP key is pushed, send a signal to oct */
            if((pcscan == 0x60) && (*SHIFT_ST & S_GRAP)){
                psignal(procp, SIGINT) ;
                *SHIFT_ST &= ~(S_SHIFT | S_GRAP | S_CTRL);
                *(KEY_ST + (pcscan >> 3)) &= ~(1 << (pcscan & 0x07));
            }
            else{
                ;
            }

} /* else end */
    } keyset(ascii, scan)
        unsigned char ascii;
        unsigned char scan;
        {
            register struct keyent *kp;

if(*KEY_NO < 16){
                kp = (struct keyent *)phystokv(PHYSBASE + *EMP_P);
                kp->k_ascii = ascii;
                kp->k_scan = scan;
                (*KEY_NO)++;
                *EMP_P += 2;
                if(*EMP_P == (short)(BUF_TOP + 16)){
                    *EMP_P = (short)BUF_TOP;
                }
                else{
                    ;
                }
            }
            else{
                if(!(*SAFLAGS & 0x20) && !Kd.k_tone){
                    kdmk_tone(kd_state + kdvt_active, 700, 50) ;
                }
                else{
                    ;
                }
            }
        }

/* key data */
struct   keyent {
        unsigned char k_ascii;
        unsigned char k_scan;
        };

/* bios work area */
#define BUF_TOP ((struct keyent *)(0x0502))
#define TOP_P   ((short *)phystokv(PHYSBASE + 0x0524))
#define EMP_P   ((short *)phystokv(PHYSBASE + 0x0526))
#define KEY_NO  ((char *)phystokv(PHYSBASE + 0x0528))
```

```
#define SHIFT_ST      ((char *)phystokv(PHYSBASE + 0x053a))
#define KEY_ST        ((char *)phystokv(PHYSBASE + 0x052a))

#define SAFLAGS       ((char *)phystokv(PHYSBASE + 0x0500))

/* SHIFT_ST status */
#define S_NON   0x00
#define S_SHIFT 0x01
#define S_CAPS  0x02
#define S_KANA  0x04
#define S_GRAP  0x08
#define S_CTRL  0x10

/* scan2acii table offset */
#define T_NON        0x00    /* S_NON */
#define T_SHIFT      0x01    /* S_SHIFT */
#define T_CAPS       0x02    /* S_CAPS */
#define T_SHIFTCAPS  0x03    /* S_SHIFT + S_CAPS */
#define T_KANA       0x04    /* S_KANAI */
#define T_KANASHIFT  0x05
#define T_GRAP       0x06
#define T_CTRL       0x07
```

What is claimed is:

1. A computer system with a minor operating system that runs under a main operating system and where the minor operating system uses the main operating system to do input/output, the system comprising:

a minor operating system, having a memory for temporarily storing data for exchange with a plurality of peripherals and a first device driver that shuttles any data I/O between an application program and said peripherals via said memory; and a main operating system having a detector that responds to data I/O requests with peripherals, a request handler that determines whether or not the request is directed to the minor operating system, and a second device driver for directing data I/O between said memory and said peripherals when said request has been determined to belong to the minor operating system.

2. The system of claim 1, wherein:

said peripheral comprise at least one keyboard;

said memory temporarily stores data input from said keyboard and said first device driver passes data from the keyboard to said application program via said memory; and said second device driver writes data from the keyboard directly into said memory when data input from the keyboard is directed to the minor operating system.

3. The computer system of claim 1, wherein:

data requests are determined to be directed to the minor operating system based on subprocess control data within the domain of the main operating system.

4. A computer-implemented process for running a plurality of operating systems on a common computer hardware system, the process comprising the steps of:

defining data peripherals attached to a computer system to be associated with a particular one of a plurality of operating systems;

monitoring said data peripheral for data traffic; and steering said data traffic between said data peripherals and operating systems according to which data peripheral has been assigned to which operating system in the step of defining.

5. A computer-implemented process for running a plurality of operating systems on a common computer hardware system, the process comprising the steps of:

defining data peripherals attached to a computer system to be associated with a particular one of a plurality of minor operating systems running as subprocesses in a main operating system;

monitoring said data peripheral for data traffic in a device driver controlled by said main operating system; and steering said data traffic between said data peripherals and minor operating systems according to which data peripheral has been assigned to which minor operating system in the step of defining.

6. The method of claim 5, wherein:

the defining is such that a table of assignments is constructed that can be used for the step of steering to properly route data between peripherals and operating systems.

7. The method of claim 5, wherein;

the monitoring step comprises using interrupts and service routines to accept input data from one or more of said peripherals.

8. A system for running a plurality of operating systems on a common computer hardware system, the system comprising:

means for defining which data peripherals attached to a computer system are to be associated with a particular one of a plurality of minor operating systems running as subprocesses in a main operating system;

means for monitoring said data peripheral for data traffic through a device driver controlled by said main operating system; and means for steering said data traffic between said data peripherals and minor operating systems according to which data peripheral has been assigned to which minor operating system in the step of defining, the steering means steering said data traffic such that data from peripherals is written to input buffers associated the respective minor operating system.

9. A computer system, comprising:
minor operating system means including:
   memory means for storing data for exchange with an input peripheral, and
   first device driver means for transferring data between an application program executable by said minor operating system means and said memory means; and
main operating system means including:
   means for detecting a data I/O request from the peripheral,
   decoding means, responsive to said detecting means, for determining whether the request is directed to said minor operating system means, and
   second device driver means, responsive to said decoding means, for transferring data between said memory means and the peripheral when the request is directed to said minor operating system means and for transferring data between said main operating system means and the peripheral when the request is not directed to said minor operating system means.

10. The system of claim 9 wherein said detecting means detects the request by detecting an interrupt associated with input data.

11. The system of claim 9 wherein said decoding means determines the request based on an attribute table controlled by a subprocess in the main operating system means.

12. A computer-implemented process, comprising:
detecting a data I/O request from an input peripheral;
determining whether the request is directed to a minor operating system;
if the request is directed to the minor operating system, transferring data between the peripheral and a buffer associated with the minor operating system for communication between the buffer and an application program executable in the minor operating system; and
if the request is not directed to the minor operating system, transferring data between the peripheral and a main operating system.

13. The process of claim 12 wherein said detecting step includes detecting the request by detecting an interrupt associated with input data.

14. The process of claim 12 wherein said determining step includes determining the request based on an attribute table controlled by a subprocess in the main operating system.

15. The process of claim 14, wherein the detecting step includes detecting the request from a keyboard; and wherein said step of transferring data between the peripheral and the buffer includes:
   writing input data to a key input condition table so that the minor operating system can recognize the data;
   writing the input data to a shift condition table if the shift key has been pressed;
   converting key codes associated with the input data to corresponding character codes; and
   outputting the character codes to the buffer.

16. A computer system, comprising:
a plurality of subprocess means, at least one of which comprises a minor operating system means that includes:
   memory means for storing data for exchange with an input peripheral, and
   first device driver means for transferring data between an application program executable by said minor operating system means and said memory means; and
main operating system means including:
   means for detecting a data I/O request from the peripheral,
   decoding means, responsive to said detecting means, for determining whether the request is directed to said minor operating system means, and
   second device driver means, responsive to said decoding means, for transferring data between said memory means and the peripheral when the request is directed to said minor operating system means and for transferring data between said main operating system means and the peripheral when the request is not directed to said minor operating system means.

17. The system of claim 16 wherein said detecting means detects the request by detecting an interrupt associated with input data.

18. The system of claim 16 wherein said decoding means determines the request based on an attribute table controlled by a subprocess in the main operating system means.

19. A computer-implemented process, comprising:
detecting a data I/O request from an input peripheral;
determining whether the request is directed to a subprocess that comprises a minor operating system out of a plurality of subprocesses;
if the request is directed to the minor operating system, transferring data between the peripheral and a buffer associated with the minor operating system for communication between the buffer and an application program executable in the minor operating system; and
if the request is not directed to the minor operating system, transferring data between the peripheral and a main operating system.

20. The process of claim 19 wherein said detecting step includes detecting the request by detecting an interrupt associated with input data.

21. The process of claim 19 wherein said determining step includes determining the request based on an attribute table controlled by a subprocess in the main operating system.

22. The process of claim 21, wherein the detecting step includes detecting the request from a keyboard; and wherein said step of transferring data between the peripheral and the buffer includes:
   writing input data to a key input condition table so that the minor operating system can recognize the data;
   writing the input data to a shift condition table if the shift key has been pressed;
   converting key codes associated with the input data to corresponding character codes; and
   outputting the character codes to the buffer.

* * * * *